United States Patent [19]

Plester

[11] Patent Number: 5,186,902

[45] Date of Patent: Feb. 16, 1993

[54] SUPPLY OF CONTROLLED, MEDIUM-PRESSURE $CO_2$ GAS IN SIMPLE, CONVENIENT DISPOSABLE PACKAGING

[75] Inventor: George Plester, Essen, Fed. Rep. of Germany

[73] Assignee: The Coca-Cola Company, Atlanta, Ga.

[21] Appl. No.: 525,067

[22] Filed: May 18, 1990

Related U.S. Application Data

[63] Continuation-in-part of Ser. No. 423,697, Oct. 17, 1989, which is a continuation of Ser. No. 108,921, Oct. 15, 1987.

[51] Int. Cl.$^5$ ............................................. G05D 16/04
[52] U.S. Cl. ................................... 422/112; 422/236; 422/238; 422/237; 422/239; 261/DIG. 7; 426/561; 426/551; 426/591; 426/477; 99/323.1; 99/323.2
[58] Field of Search .................. 422/114, 236–239; 261/DIG. 7; 426/561, 551, 591, 477; 99/323.1, 323.2

[56] References Cited

U.S. PATENT DOCUMENTS

| | | | |
|---|---|---|---|
| 497,097 | 5/1893 | Jackson | 422/236 |
| 576,087 | 2/1897 | Braun | 422/236 |
| 978,641 | 12/1910 | Poe | 422/112 |
| 1,245,807 | 11/1917 | Shaw | 422/112 |
| 1,810,672 | 6/1931 | Minrath | 422/236 |
| 2,062,609 | 12/1936 | Reid | 23/282 |
| 2,073,273 | 3/1937 | Wetstein | 225/10 |
| 2,170,531 | 8/1939 | Kahn | 221/74 |
| 2,190,688 | 2/1940 | Snelling | 225/18 |
| 2,322,183 | 6/1943 | Ward | 225/18 |
| 2,855,307 | 10/1958 | Konig | 99/79 |
| 3,372,996 | 3/1968 | Barrett | 422/99 |
| 3,453,086 | 7/1969 | Harm | 23/202 |
| 3,476,520 | 11/1969 | Hovey | 23/202 |
| 3,480,403 | 11/1969 | Hovey | 23/202 |
| 3,492,671 | 1/1970 | Hovey | 99/275 |
| 3,516,798 | 6/1970 | Kegan | 23/202 |
| 3,554,707 | 1/1971 | Holmes | 23/202 |
| 3,585,007 | 6/1971 | Gross | 23/202 |
| 3,615,252 | 10/1971 | DiPietro | 23/202 |
| 3,820,956 | 6/1974 | Titterington | 23/202 |
| 4,040,342 | 8/1977 | Austin et al. | 99/323.1 |
| 4,055,632 | 10/1977 | Hoffman | 423/657 |
| 4,186,215 | 1/1980 | Buchel | 426/86 |
| 4,261,956 | 4/1981 | Adlhart | 422/236 |
| 4,399,744 | 8/1983 | Ogden | 99/323.1 |
| 4,466,342 | 8/1984 | Basile | 99/323.1 |
| 4,636,337 | 1/1987 | Gupta | 261/64.3 |
| 5,021,219 | 6/1991 | Ruddick et al. | 422/112 |
| 5,102,627 | 4/1992 | Plester | 422/120 X |

FOREIGN PATENT DOCUMENTS 3320197 6/1984 Fed. Rep. of Germany .
2165955 10/1973 France .

Primary Examiner—Robert J. Warden
Assistant Examiner—Stephanie Blythe
Attorney, Agent, or Firm—Birch, Stewart, Kolasch & Birch

[57] ABSTRACT

A $CO_2$ gas generator for a utilization device is located in a housing and chemically generates $CO_2$ from a chemical reaction between two reagents contained within a common container. The reagents are located in different chambers of the container with a $CO_2$ accumulation region being included in one of the chambers. A reference pressure source of a predetermined pressure forces the two reagents into contact with each other when the pressure of gas in the $CO_2$ accumulation region is less than the predetermined pressure whereupon $CO_2$ is generated in one of the chambers. An output conduit in fluid communication with the $CO_2$ accumulation region is provided to withdraw the generated gas from the generator. As the $CO_2$ is withdrawn, the gas pressure drops permitting more mixing of the reagents. When the $CO_2$ pressure becomes equal to or higher than the predetermined pressure applied by the reference pressure source, the reagents become separate again and gas generation ceases.

33 Claims, 11 Drawing Sheets

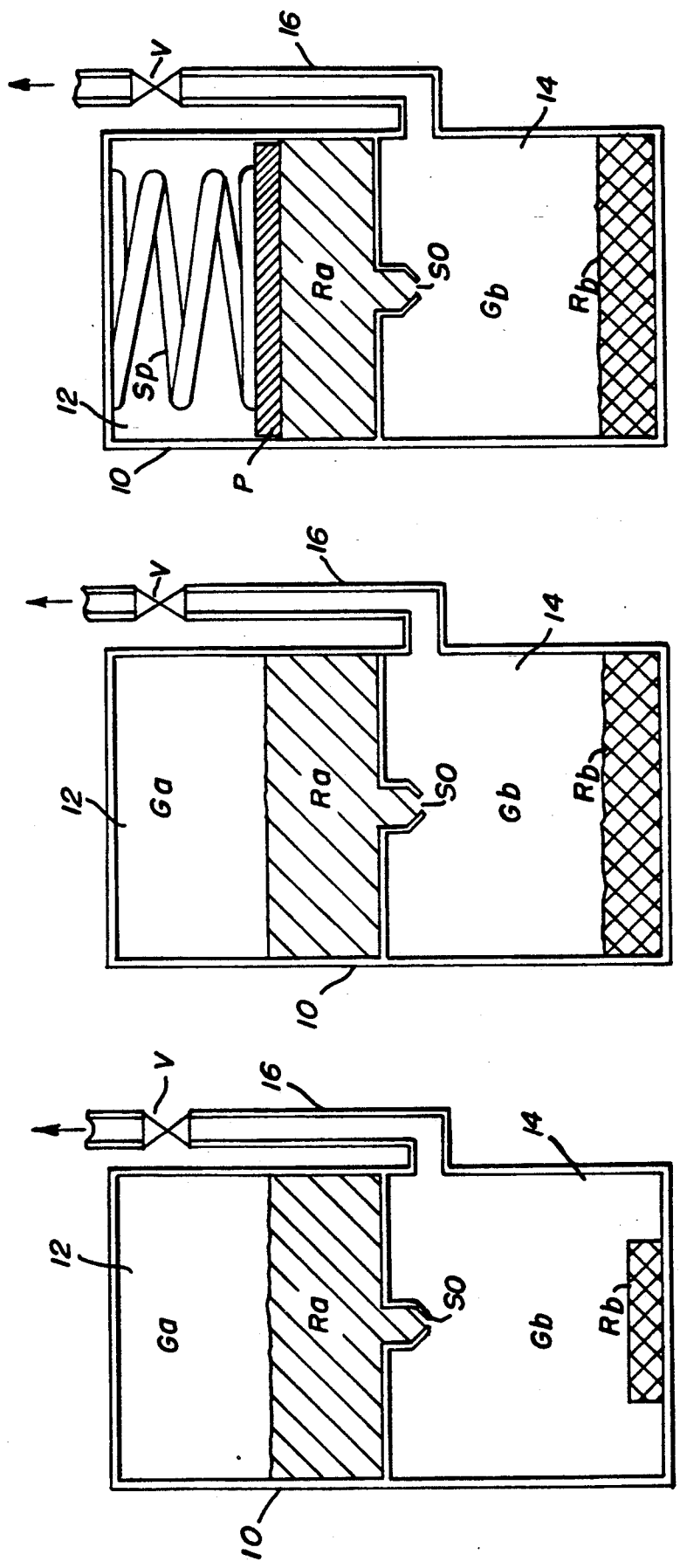

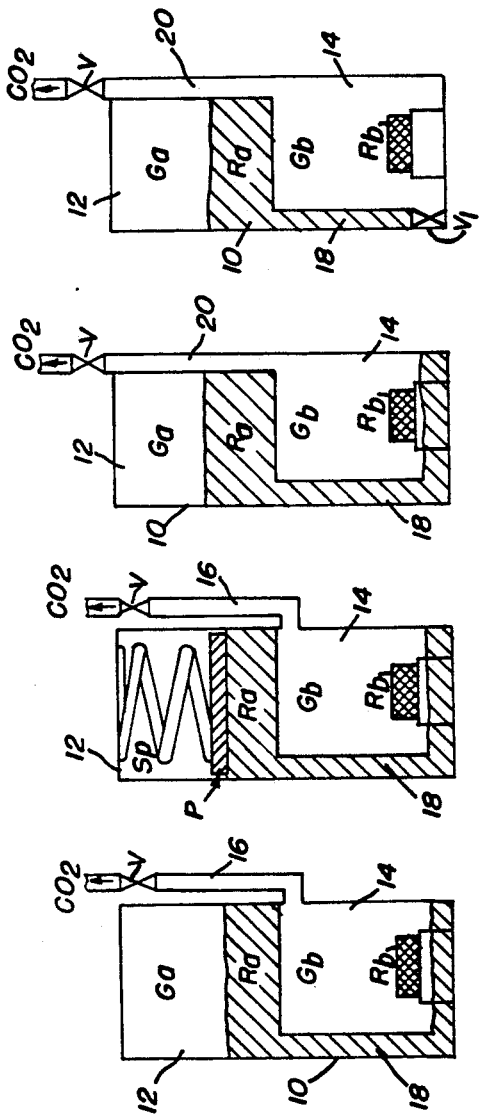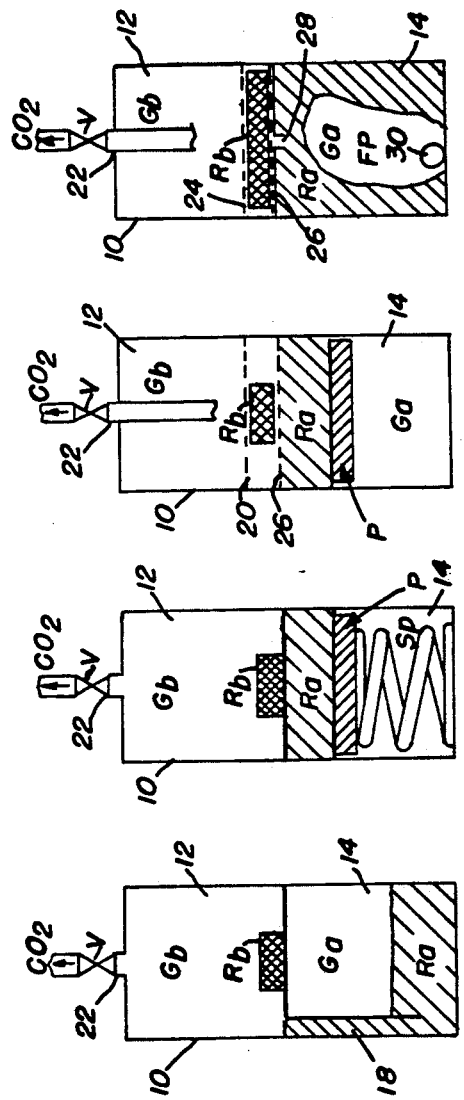

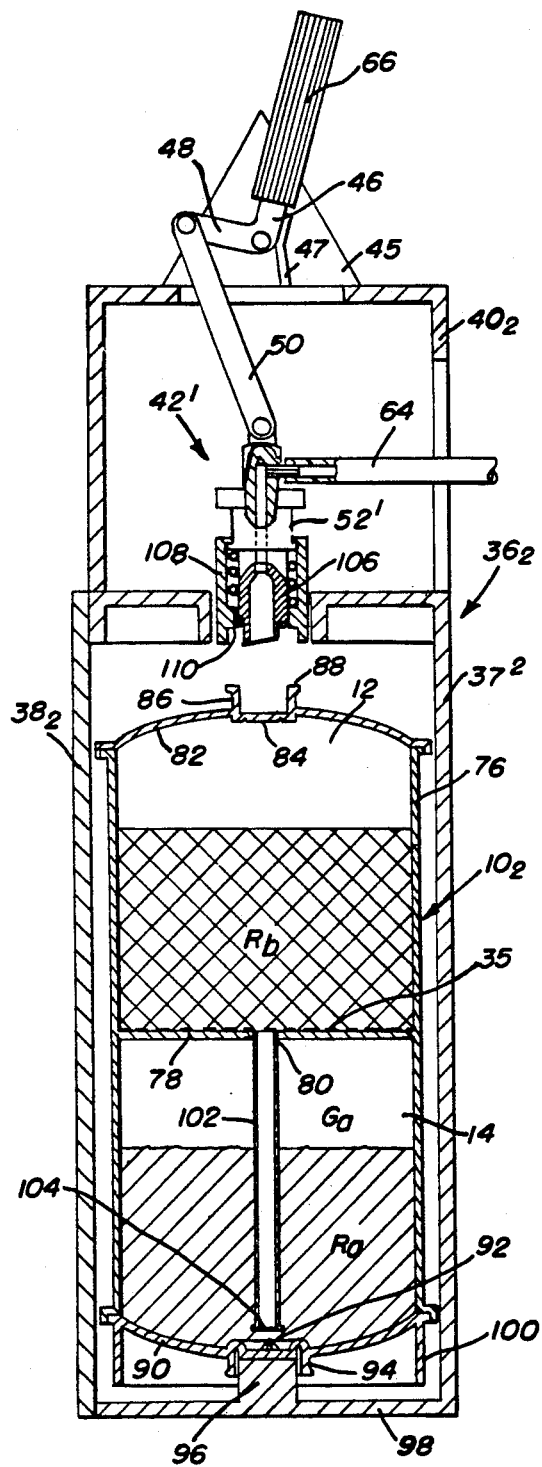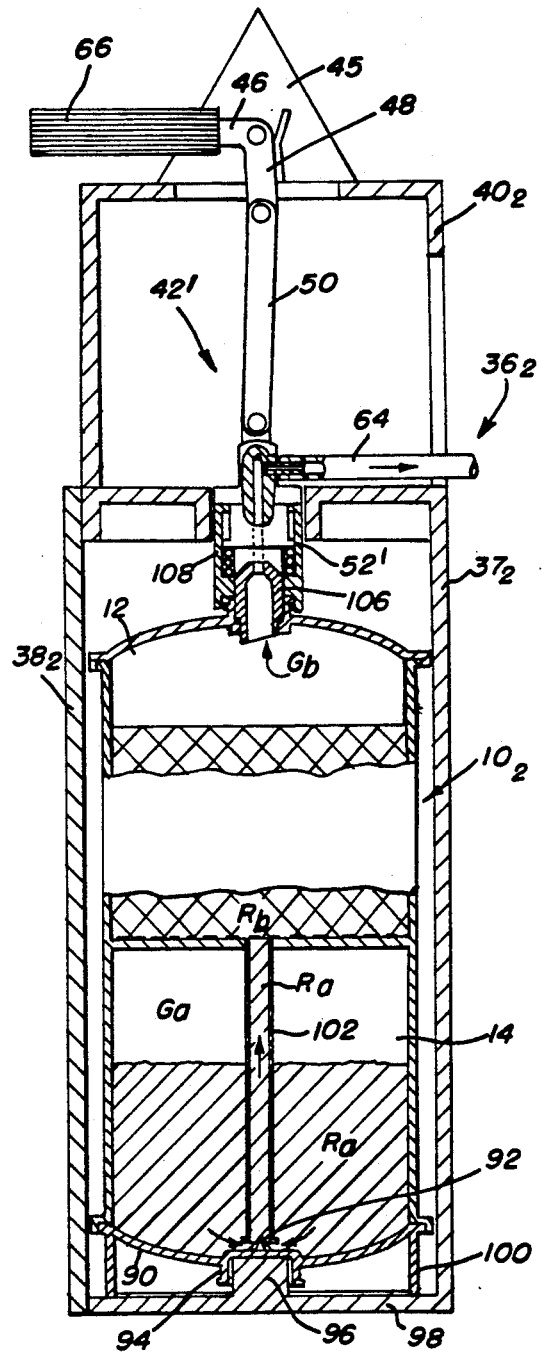
FIG. 3C
FIG. 3D ically well and can therefore be more readily duplicated.

SUPPLY OF CONTROLLED, MEDIUM-PRESSURE CO₂ GAS IN SIMPLE, CONVENIENT DISPOSABLE PACKAGING

This application is a Continuation-in-part of prior application Ser. No. 07/423,697, filed Oct. 17, 1989, which is a Continuation of prior application Ser. No. 07/108,921, filed Oct. 15, 1987.

BACKGROUND OF THE INVENTION

The present invention relates generally to gas generators and more particularly to a disposable $CO_2$ gas generator which utilizes chemical reactants to generate the $CO_2$ gas.

Conventional $CO_2$ gas cylinders are heavy, relatively expensive and available only as returnable, refillable packages. Since such cylinders are under very high pressure, handling requires appropriate care.

With the trend toward mini-sized and home-dispensers for soft-drinks, where the syrup-packaging is generally one-way, it is logistically attractive to make one-way $CO_2$ packaging also available. Moreover, certain conventional distribution channels, such as supermarket stores, could only be effectively exploited if one-way packaging were available. An additional factor is that lay dispenser users are understandably nervous of handling high-pressure gas cylinders. High pressure $CO_2$ capsules, generally containing about 8 g $CO_2$, are already available, but these are expensive and restricted in practical capacity to a limit of around 16-20 g. They do not, therefore, represent a solution, since such quantities are barely sufficient for carbonating 2 liters of beverage without reckoning the considerable additional $CO_2$ quantities needed for propulsion of the beverage in the dispenser.

Inexpensive, light-weight, unpressurized or moderately pressurized $CO_2$ packaging can therefore provide a whole scope of new business opportunities with respect to small-sized dispensers designed for non-professional users.

This invention is directed to two main objectives which are not presently met with state of the art apparatus: first, to provide a disposable alternative to the conventional high pressure gas cylinder, utilized, for example, in pre-mix beverage dispensers suitable for home use, and second to provide a miniature self-pressure controlling source for such application as pressurizing the head space of beverage bottles and aerosol cans.

Clearly, if a disposable device is to be acceptable in practice for home use, it must be safe to use, at least as easy and convenient as a gas cylinder, and provide acceptable economics. This is a very exacting requirement, since gas cylinders are generally very safe, require only one single coupling-up action by the user, who does not need any special knowledge, and are reusable almost indefinitely. Known devices, which call for a series of manipulations by the user, are unacceptable since they can never provide an adequate substitute for a single-manipulation gas cylinder. Even two manipulations are inconvenient in comparison with the existing alternative and are also inherently unsafe, because an unsophisticated user can mistakenly use the wrong sequence. Moreover, heavy, complicated devices, may achieve the required convenience and safety aspects, but fail to meet the economic requirements.

To provide a miniature self-pressure controlling source of gas for such applications as aerosols or beverage bottles comprises a task which is quite different from the first since the first objective involves a relatively large gas supply while the second implies the capability of miniaturizing a self-controlled gas supply source. The second objective, moreover, does not provide an alternative to an existing conventional system, but rather provides something for low-boiling point gases such as $CO_2$, which is currently not available at all.

Gas cylinders, such as used for supplying $CO_2$ to carbonated beverage dispensers, must support very high pressures and are therefore heavy, expensive, and only suitable as refillable non-disposable containers. In many applications, a gas supply in an inexpensive disposable package would be of great benefit, but such a device would have to circumvent the need to store gas at high pressure, since this inevitably implies heavy-walled expensive vessels, defeating the disposability objective. The present invention resolves this problem by generating gas on demand at a predetermined controlled pressure.

For pressurizing the head-space of small containers, e.g. aerosols, beverage bottles, soda syphons, etc., two basic methods have hitherto been available. First, a liquid close to its boiling point at normal temperatures has been used, for example, in aerosol containers. However, this method involves using chemicals having doubtful health and environmental properties. Secondly, containers have been known to be pressurized by a relatively safe permanent gas, such as air to $CO_2$, but this has required high pressures and doubtful safety as well as economics. A gas source, which maintains itself at reasonably constant pressure, responds to demand and can be provided by a device, which is small enough to be fitted into small containers, would provide a solution to this problem, since $CO_2$ can be used to fill the headspace without the attendant high-pressure penalties.

A well-known device originally produced for laboratory use is referred to as a Kipps apparatus. However, this equipment can only produce gas at pressures of a few mm Hg and is not portable in its fully loaded state. Furthermore, it is not in a form which can be disposable. It also requires operation by a trained user. It is, therefore, neither compact nor convenient for use outside a laboratory. A Kipps apparatus, however, can be filled with its solid reagent, and in the absence of the liquid reagent, can be portable. Several other known devices do use a Kipps-like principle and obtain a portability feature, simply by requiring that the user adds the liquid reagent on site. This, however, is inconvenient.

Still other devices recognize the fact that it is difficult to control the gas production on demand and, at the same time, make the system portable and suitable for any chosen gas pressure. These devices obviate the problem by employing a single-step reaction, i.e. a reaction in which all the chemicals are mixed and give up their total gas content in a single operation. But such devices cannot be connected to conventional gas users with continuous gas demand, such as beverage dispensers. In effect, the gas produced by the single-step reaction needs a gas cylinder to store it, so the purpose is defeated. Moreover, most of these devices also require manipulation by the user, usually the addition of water.

SUMMARY OF THE INVENTION

Accordingly, it is a primary object of the present invention to provide a device, which enables the generation of gas at a predetermined pressure, by automatically mixing the necessary reagents to the required degree.

It is another object of the present invention to provide a fully automatic gas generator which is also portable and easily deliverable.

It is yet another object of the present invention to provide a disposable gas generator which is at or near user pressure.

It is still another object of the present invention to provide a non-pressurized device which can be combined with an outside reference pressure source to generate gas automatically by mixing the necessary reagents to the degree required to maintain the reference pressure.

It is a further object of the present invention to provide a device, which can maintain a predetermined pressure in the head-space of a beverage container during use.

It is yet a further object of the present invention to provide a device, which can maintain a predetermined pressure in a liquid container and also propel the liquid through a simple dispensing head.

It is still a further object of the present invention to provide a dispensing head for a container of a simple disposable construction.

It is another object of the present invention to provide a gas generator capsule construction suitable for use in an aerosol container for maintaining head space pressure.

The present invention involves the use of a substance, such as sodium bicarbonate, which in contact with a liquid acid, such as phosphoric acid, generates a gas, namely carbon dioxide ($CO_2$) Alternatively, a powdered mixture of bicarbonate and a solid acid, such as citric acid, may be employed and then only water is needed to release the $CO_2$ gas. The chemicals used can be types normally found in beverages, so that their use in a beverage dispensing system, or other food application, need not arouse concern. Since the chemicals only generate a gas pressure when they are mixed in the aqueous state, their packaging can be relatively simple.

According to the present invention, a plurality of devices are shown and described which package the chemicals within a system, which release $CO_2$ at a predetermined pressure. It allows the chemicals to be consumed only as and when $CO_2$ gas is drawn off i.e. on demand, whereby the chemicals react just sufficiently to maintain the required user pressure. The net result is that the chemical mixture can either be supplied as a liquid system or as a liquid-solid system or finally as a solid system, depending on application. It furthermore can be contained in relatively simple plastic packaging, capable of withstanding only moderate pressures, or depending on the system employed by the user, even in non-pressurized dry solid form. this involves relatively inexpensive packaging and the system as a whole can provide the user with simplicity and convenience.

A convenient $CO_2$ gas-generation package is also disclosed which has uses in many household applications associated with beverages and other products, aside from direct use in beverage dispensers. Examples of these include: (a) pencil-like capsules inserted in large carbonated beverage bottles prior to capping, which release $CO_2$ once the closure is applied, and thus maintain a $CO_2$ pressure in the head-space of the package until the product is consumed; (b) inclusion of gas-generator in simple pre-mix dispensing heads, thus maintaining a head-space pressure in extra-large beverage bottles and bottles of other products, so that the user may dispense the liquid by simply pressing the dispensing head; and (c) inclusion of a gas-generator in devices requiring a propellant gas, such as aerosol cans, since presently used halogenated hydrocarbons are known to be potentially harmful and since $CO_2$ is both nonflammable and completely harmless both to humans and the environment.

Further scope of applicability of the present invention will become apparent from the detailed description given hereinafter. However, it should be understood that the detailed description and specific examples, while indicating preferred embodiments of the invention, are given by way of illustration only and are not meant to be interpreted in a limiting sense, since various changes and modifications within the spirit and scope of the invention will become apparent to those skilled in the art.

BRIEF DESCRIPTION OF THE DRAWINGS

The present invention will become more fully understood when the detailed description given hereinbelow is considered with the accompanying drawings wherein:

FIGS. 1A to 1C are side elevational diagrammatic views illustrating the basic principles of the gas generators of the present invention;

FIGS. 2A to 2H are diagrammatic views illustrating further variations of the basic principles for the gas generators of the present invention;

FIGS. 3C and 3D are central longitudinal sectional views of a second embodiment of a gas generator according to the present invention;

DETAILED DESCRIPTION OF THE INVENTION

Basic Principles

Figure 3A:
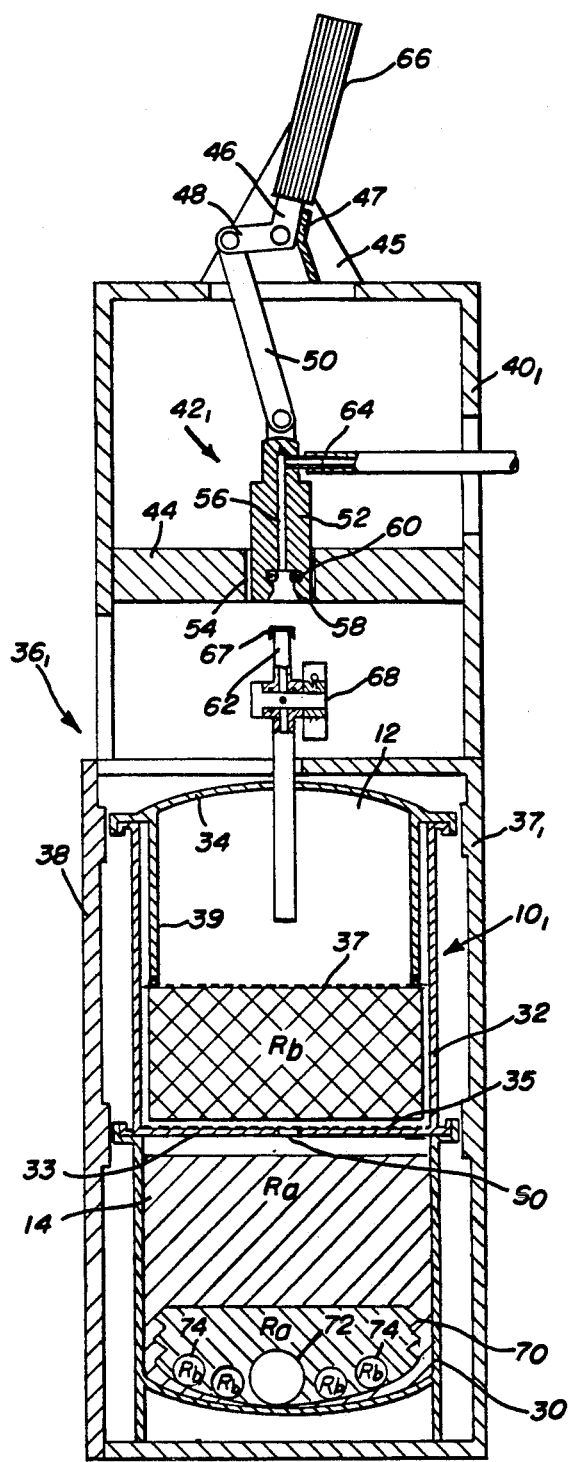
FIGS. 3A and 3B are central longitudinal sectional views of a first embodiment of a gas generator according to the present invention.

The basic principles underlying the present invention are shown in the mechanical schematic diagrams of FIGS. 1A to 1C. First, in FIG. 1A, a container 10 includes an upper and lower chamber 12 and 14. A pre-pressurized gas $G_a$ in the upper chamber 12 presses a reagent $R_a$ through a small orifice SO. As reagent $R_a$ contacts reagent $R_b$ in the lower chamber 14, a gas $G_b$ such as $CO_2$ is released. Reagent $R_a$ continues to flow through to the chamber 14, until the gas pressure in chamber 14 is equal to that of chamber 12 whereas flow stops due to the surface tension of liquid $R_a$ on the orifice 50.

The size of the orifice SO is designed in accordance with the type of reagent $R_a$ utilized and the desired pressure of the gas $G_a$ present in the upper chamber 12. When $G_b$ gas is drawn off by opening valve V in the line 16, more reagent $R_a$ flows into chamber 14 so as to equalize pressures again. The pre-set pressure of the gas $G_a$ in chamber 12 acts as a reference and controls the product gas-pressure accordingly. In effect, it acts as a pre-set memory pressure. As a result, the gas content of reagents $R_a$ and $R_b$ is released only as it is used and the total pressure of the system does not exceed that of the pre-set reference of $G_a$, which in effect is the user-pressure, i.e. the lowest system-pressure possible. The system is thus automatic in response and once pre-packaged delivers gas at the pre-arranged pressure until the reagents are exhausted. The user only needs to open valve V. As a result, simple materials can be used for packaging the system, since relatively low pressures are involved.

Regarding the reagents $R_a$ and $R_b$, many options are available. Reagent $R_a$, for example, can be simply water, while $R_b$ would then preferably be a solid mixture of alkali and acid (e.g. sodium bicarbonate and citric acid). Alternatively, $R_a$ could be an acid solution (e.g. phosphoric acid) and $R_b$ an alkali such as sodium bicarbonate, enabling quicker system responses to pressure change. For rapid system response to pressure change, both $R_a$ and $R_b$ could be aqueous solutions, as indicated in FIG. 1B.

The pressure memory provided by gas $G_a$ in chamber 12 can, when desired, be replaced by a mechanical system, such as a spring, as shown in FIG. 1C, if this is more convenient to a particular application. In such a case, the gas in chamber 12 is replaced by a spring $S_p$ and a piston or membrane P, or by similar devices. All devices must have the effect of providing a constant and desired pressure on the reagent $R_a$ the orifice SO.

Depending on application, other variations of the basic principle are also possible, as shown in FIGS. 2A to 2H. For example, as depicted in FIGS. 2A–2D, the reagents $R_a$ and $R_b$ may be allowed to achieve a balance, whereby reagent $R_a$ flowing down a connecting duct 18 on the side of the container 10 is pushed back into chamber 12 once the gas pressures $G_a$ and $G_b$ have equalized. This feature can be used, where precise control of the equilibrium is desirable.

In FIG. 2A, reagent $R_a$ flows into reagent $R_b$ until the gas pressure $G_b$ in the lower chamber 14 is in equilibrium with $G_a$. At that point, the reagent $R_a$ is pushed back by the pressure away from $R_b$, stopping the reaction. In FIG. 2B, the same effect is achieved using a spring SP or similar mechanical pressure exerting device, together with a piston P or movable membrane, instead of a pre-set gas pressure. In FIG. 2C the gas $G_b$, e.g. $CO_2$ is ducted internally via the duct 20 to the top of the container 10 which may be important in certain applications. When desirable, another valve V1 can be inserted in the duct 18 to stop all flow of the reagent $R_a$ into the lower chamber 14 until required by the user.

For applications where a gas outlet 22 is desired to be centrally located at the top of the container 10, FIGS. 2E and 2F illustrate the same principles as FIGS. 2A, 2B and 2C but here the position of the reagents $R_a$ and $R_b$ is reversed, i.e. reagent $R_b$ is located in the upper chamber 12 while reagent $R_a$ is located in the lower chamber 14.

During transportation, the reagent $R_a$ duct 18 in FIGS. 2A, 2B, 2C, and 2E would be capped by means, not shown, and opened at the time of use. Otherwise, inadvertent mixing of reagents could occur. This can be achieved by a simple valve arrangement, which is opened when the gas-generator is finally connected for use. An example of this valving ($V_1$) is illustrated in FIG. 2D.

The reagent $R_b$ can also be suspended and located centrally between two fine sieves or screens 24 and 26 as illustrated in FIG. 2G. In such a case, the reagent $R_a$ does not directly contact reagent $R_b$ even if the container 10 is placed in a horizontal or vertical position and cannot run out of the gas outlet 22 because of the configuration of the gas outlet tube. The gas $G_a$ in pressure chamber 14 acts through a membrane or piston P and thus gas $G_a$ cannot mix with the gas $G_b$ in the upper chamber 12. This type of structure can be transported without disturbing the system and is always ready for use once valve V is opened. A variation of the same system would be to use a spring Sp and piston P instead of the gas $G_a$ as shown in FIG. 2F.

Still another variation of a transportable system, is shown in 2H. There the reagent $R_b$ is suspended between two fine screens 24 and 26 with the reagent $R_a$ also being supplied through a small orifice 28. A pre-pressurized flexible gas pouch FP, dead-weighted by means of a weight 30, is now located in the lower chamber 14 so that it sinks to the bottom of the container 10. The pouch FP expands as the reagent $R_a$ becomes used to maintain the pressure in the lower chamber 14. Once $G_b$ is in equilibrium with the pressure in FP, the reagent $R_a$ is pushed back into the chamber 14 and gas generation of $G_b$ stops. Surface tension forces, as before, prevent leakage of reagent $R_a$ onto $R_b$ once pressures are equalized in chamber 12 and 14, even if the device 10 is inverted or placed in a horizontal position.

Pre-pressuring of the gas space with $G_a$ in the pouch FP can be achieved by using coated reagent pellets, not shown, together with reagent $R_a$. The pouch FP can be sealed in an unpressurized state and a predetermined pressure thereafter generated on demand dependent entirely on the quantity of reagents used. The slowly-dissolving coating could, for example, be comprised of sugar or some other slowly-dissolving medium in water or they could be activated upon being crushed or pressed together prior to use.

As a further option, the pressurized pouch FP can contain a liquid whose boiling point is chosen to provide a constant pressure at a predetermined operating temperature. Such an arrangement would be more compact, since less volume would be required.

The variations thus described are intended to indicate only a portion of the range of embodiments which utilize the same basic principles. All may have application depending on the type of user-system employed.

Physical Construction

Gas Generator

Figure 3B:
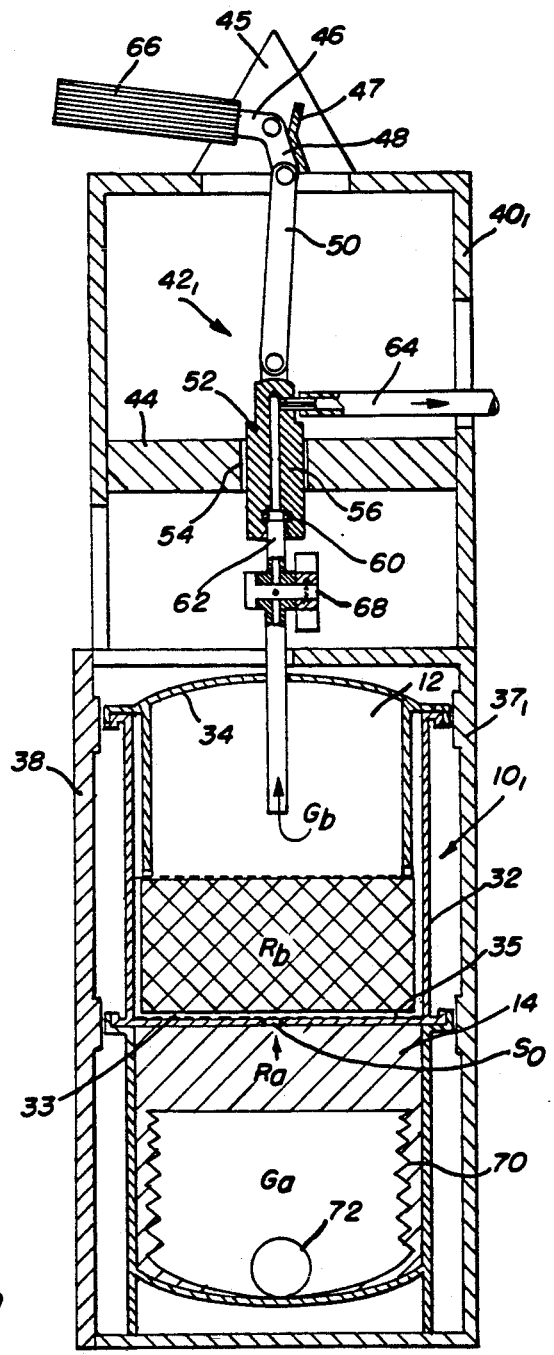

Referring now to the FIGS. 3A-3L and where like reference numerals refer to like parts, a first embodiment of a gas generator based upon the principles set forth above is shown in FIGS. 3A and 3B. There a gas generating container $10_1$, including an upper chamber 12 and a lower chamber 14, is formed from a base section 30, an upper or intermediate section 32 and a top or cap section 34. These three sections are constructed from moulded plastic parts and include interfitting flange portions as shown for providing a closed container.

Before discussing further details of the container $10_1$, it should be noted that it is located for use in a vessel comprising a housing structure $36_1$ including a lower gas generator compartment $37_1$ having a side access door $38_1$ and an upper compartment $40_1$ which is adapted to support and house an actuator mechanism $42_1$ which includes means for dispensing a gas $G_b$ such as $CO_2$ generated in the upper chamber 12 of the container $10_1$.

The actuator $42_1$ is comprised of, among other things, support member 44 which is secured to the inner wall surfaces of the upper compartment $40_1$. A manually operated actuator arm 46 is pivotally connected to a mounting block 45 including an upwardly protruding stop member 47. The actuator arm 46 further includes an inner portion 48 which pivotally connects to a straight link 50 which is attached at its lower extremity to a plunger element 52 which slidably reciprocates within a bore 54 in the support member 44.

The plunger 52 includes a gas passage 56 which terminates in its lower end in a flared coupling 58 including a sealing ring 60 which is adapted to seat on the upper end of a $G_b$ gas output tube 62 projecting out of the top or cap section 34 of the gas generator container $10_1$. The upper extremity of the gas passage 56 couples to a horizontal dispensing tube 64 which feeds out of the upper compartment 40.

As can be seen in FIGS. 3A and 3B, a counterclockwise downward movement of a handle 66 on the actuator arm 44 forces the plunger 52 downward where it contacts and seals against the upper portion of the output tube 62. Prior to such actuation, such as during transportation, and prior to use, a removable protective plastic cap 67 would be located over the end of the tube 62 as shown in FIG. 3A. Also, the output tube 62 includes a manually operated valve 68 which is kept in the closed position until gas generation is desired.

This now leads back to the details of the container $10_1$ shown in FIGS. 3A and 3B. The base section 30, which includes the chamber 14, contains a flexible plastic pouch 70 which is shown in FIG. 3A in a compressed state. Included therein is a dead-weight element 72 and a plurality of coated reagent pellets 74 of a solid reagent $R_b$ and a liquid reagent $R_a$ in predetermined proportions so that a gas $G_a$, as shown in FIG. 3B, will be generated once the coating on the pellets 74 has been dissolved or otherwise broken. A liquid reagent $R_a$ also partially fills the chamber 14 around the pouch 70, but will expand to fill the lower chamber 14 when the flexible pouch 70 expands as shown in FIG. 3B when the $G_a$ is generated therein.

The upper section 32 also includes a transverse wall 33 which contains a centralized orifice SO for the passage of reagent $R_a$ upwardly therethrough under pressure supplied by the gas $G_a$ in the pouch 70 as shown in FIG. 3B. A filter element 35 in the form of a sieve, screen or piece of filter paper is laid on the top surface of the wall 33. Reagent $R_b$ is poured in pellet or powder form on top of the filter element 35, after which a fine retention screen 37 is positioned over the reagent. The top or cap section 34 includes an inwardly projecting side wall 39 which acts to hold the reagent retention screen 37 in place.

Upon the generation of the gas G within the pouch 70, the reagent $R_a$ will travel upwardly through the orifice $R_b$ where the gas $G_b$, preferably $CO_2$, will be generated and held in the space provided in the upper region of the chamber 12. As soon as the gas pressure of the gas $G_b$ rises to the pressure of the gas $G_a$ in the pouch 70, reagent $R_a$ will be forced back into the lower chamber 14 and with the pouch 70 being forced to contract appropriately.

Assuming that the actuator mechanism $42_1$ has been activated as shown in FIG. 3B, a turning of the valve 68 to its open position will cause the gas $G_b$, i.e. $CO_2$, to rise in the output tube 62 where it is delivered to the dispensing tube 64 through the gas passage 56 in the plunger member 52. This is accompanied by an expansion of the pouch 70 which rings further reagent $R_a$ into contact with the reagent $R_b$ due to the lowering of the gas pressure in the chamber 12, thus maintaining the required gas supply pressure at a predetermined value.

Referring now to FIGS. 3C and 3D, shown thereat is a second embodiment of the invention which also includes a gas generator container, a housing therefor, and an actuating mechanism. As shown, this container is now identified by reference numeral $10_2$ and is comprised of a cylindrical unitary body section 76 having a transverse wall 78 across the middle which includes an aperture 80. A filter member 35 is positioned across the wall 78 as before in the first embodiment. A rounded top or cap section 82 is shown including a frangible disk 84 formed in cup-like section 86 including an upwardly protruding rim 88.

A rounded bottom section 90 is also shown attached to the cylindrical body section 76 and includes an upturned spike 92 which is located in an inverted cup-like section 94 which fits down over a post 96 formed in the bottom wall 98 of the lower compartment $37_2$. The bottom section 90 also includes a downwardly projecting cylindrical rim 100 which is aligned with the cylindrical body section 76.

An elongated reagent tube 102 for the flow of liquid reagent $R_a$ is mounted on the aperture 80 of the cross wall 78 and extends downwardly into the lower chamber 14. The lower end of the tube 102 contains a foil type seal or membrane 104 which can be pierced by the spike 92 positioned directly beneath it.

Considering the actuator mechanism for this embodiment which is shown by reference numeral 42', it is similar to that shown in FIGS. 3A and 3B, with the exception that the plunger 52 has been modified into a puncture type mechanism 52' which includes a spring loaded punch 106 member located within a sleeve 108 including a shoulder 110 which is adapted to engage the circular rim 88 of the section 86 in the cap 82 of the container $10_2$.

Referring now to FIG. 3D, when the handle 66 is actuated as shown, the punch mechanism 52' is lowered so that the shoulder 110 of sleeve 108 seats on the rim 88 which then permits the punch 106 to knock out the frangible disk 84 shown in FIG. 3C. At the same time, the whole container $10_2$ is pushed downwardly until the cylindrical rim 100 of the bottom section 90 strikes the bottom wall 98 of the lower compartment $37_2$ which causes the spike 92 to puncture the membrane 104 at the bottom of the reagent tube 102.

With the upper chamber 12 containing the reagent $R_b$, and the lower chamber 14 containing the liquid reagent $R_a$ in the lower portion and with the gas $G_a$ in the upper portion, when the spike 92 punctures the membrane 104, the gas $G_a$ will force the reagent $R_a$ up through the tube 102 where it contacts the reagent $R_b$ after being filtered by the element 35. As before, $CO_2$ gas, for example, is formed in the upper portion of the chamber 12 where it is fed out to the delivery tube 64.

Figure 3E:
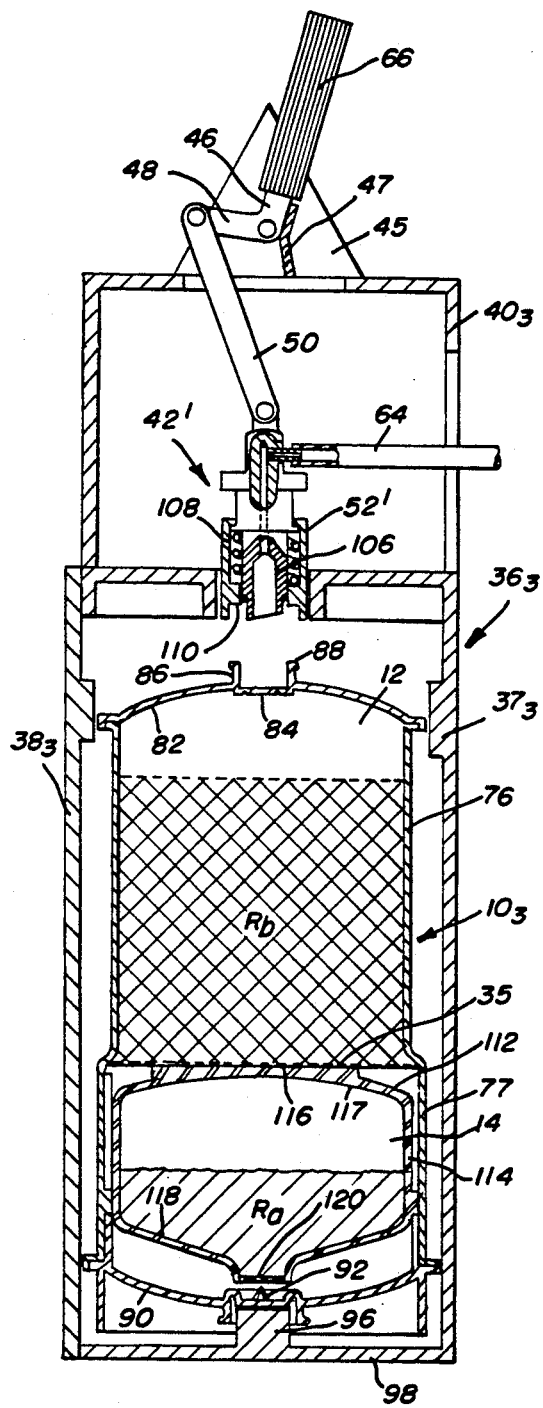
FIGS. 3E and 3F are central longitudinal sectional views of a third embodiment of a gas generator according to the present invention.
Figure 3F:
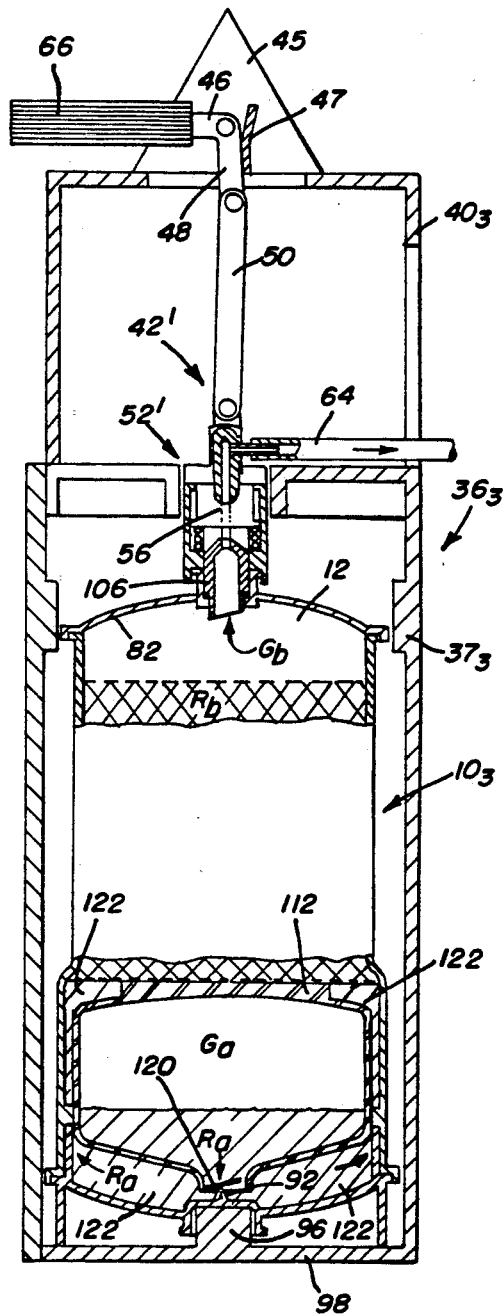

Considering now the third embodiment of the invention, it is depicted in FIGS. 3E and 3F. This embodiment is substantially the same as the second embodiment shown in FIGS. 3C and 3D with the exception of the construction of the gas generating container. As shown, this gas generating container is identified by reference numeral $10_3$. The container $10_3$ includes both top and bottom sections 82 and 90, respectively, which are the same as the second embodiment. The construction of container $10_3$ differs with the shape of the cylindrical body section 76 and its internal construction. As shown, the generally cylindrical body section 76 includes a lower section 77 which is widened to accommodate a separate closed $R_a$ reagent container 112. The reagent container 112 includes a separate side wall section 114 which is secured to the lower body section 77. It also includes an upper wall section 116 which is thickened at 117 to accommodate the filter element 35 and to provide a liquid flow path 118 to the reagent $R_b$. The lower wall 118 funnels down to a membrane or sealing member 120.

As shown in FIG. 3F, when the actuator 42' is operated, the mechanism 52' lowers into position over the cup section 86 where the spring loaded punch 106 again removes the frangible disk 84. The container $10_3$ is also forced downward, causing the spike 92 to pierce the seal/membrane 120. The reagent container 112 includes a pressurized gas $G_a$ and a reagent $R_a$, which then flows out into the space 122, where it is forced upward around the side wall 114 to the location of the filter 35 and the reagent $R_b$, whereupon $CO_2$, for example, will be generated and fed up through the punch 106 and channel 56 to the outlet tube 64 as before.

Figure 3G:
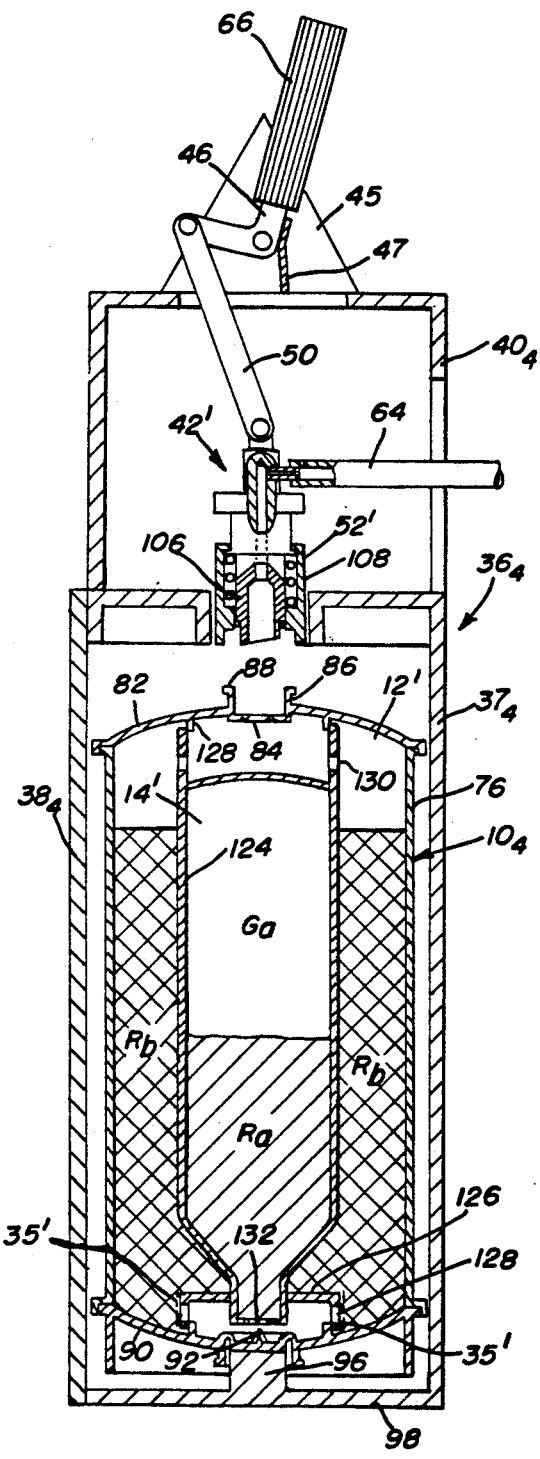
FIGS. 3G and 3H are central longitudinal sectional views of a fourth embodiment of a gas generator according to the present invention.
Figure 3H:
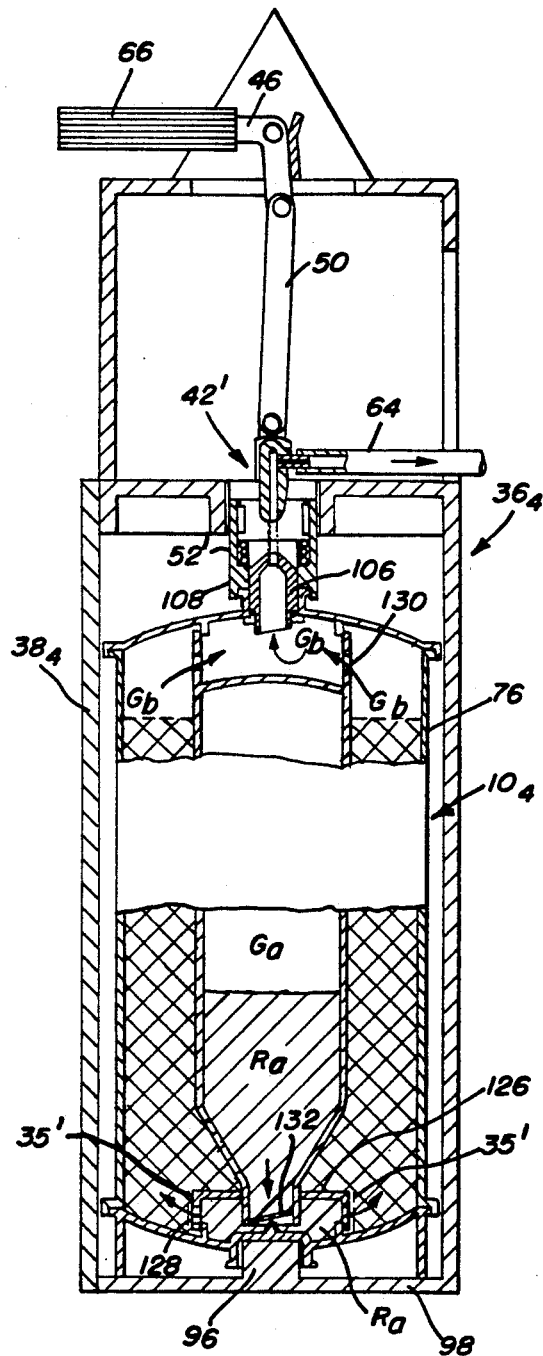

With respect to the fourth embodiment of the invention, it is disclosed in FIGS. 3G and 3H. This embodiment constitutes a modification of the third embodiment shown in FIGS. 3E and 3F insofar as the inner construction of the gas generator container is concerned. As shown, the container is identified by reference numeral $10_4$ and is comprised of an elongated cylindrical body section 76 and including a previously described top cap section 82 and a bottom or base section 90. The difference is in the chambers 12 and 14.

Now instead of having top and bottom chambers for the reagents $R_b$ and $R_a$, respectively, this embodiment contemplates an annular outer chamber 12' and an elongated concentric inner chamber 14', respectively, with the inner chamber 14' being formed by means of an inverted elongated bottle shaped closed container member 124 which is held in place by a pedestal type structure 126 attached to the bottom section 90 and a flange 128 formed on the inner portion of the top section 82. The pedestal 126 includes one or more openings 128 and filter elements 35' therein for the flow of reagent $R_a$ therethrough. The upper portion of the bottle type container 124 also includes one or more openings 130 therein for the passage of the gas $G_b$ therethrough as shown in FIG. 3H.

Further as shown in FIGS. 3G and 3H, pressurized gas $G_a$ and reagent $R_a$ is located in the inverted bottle type container 124 which is surrounded by reagent $R_b$. When the actuator mechanism 42' is operated as shown in FIG. 3H, a seal 132 in the neck of container 124 is punctured by the spike 92, causing the reagent $R_a$ to flow out of the openings 128 in the pedestal 126 where it contacts the reagent $R_b$, causing the gas $G_b$ to be generated. The gas $G_b$ then accumulates in the top portion of the chamber 12', where it is fed out to the outlet tube 64 in a manner previously described.

Figure 3I:
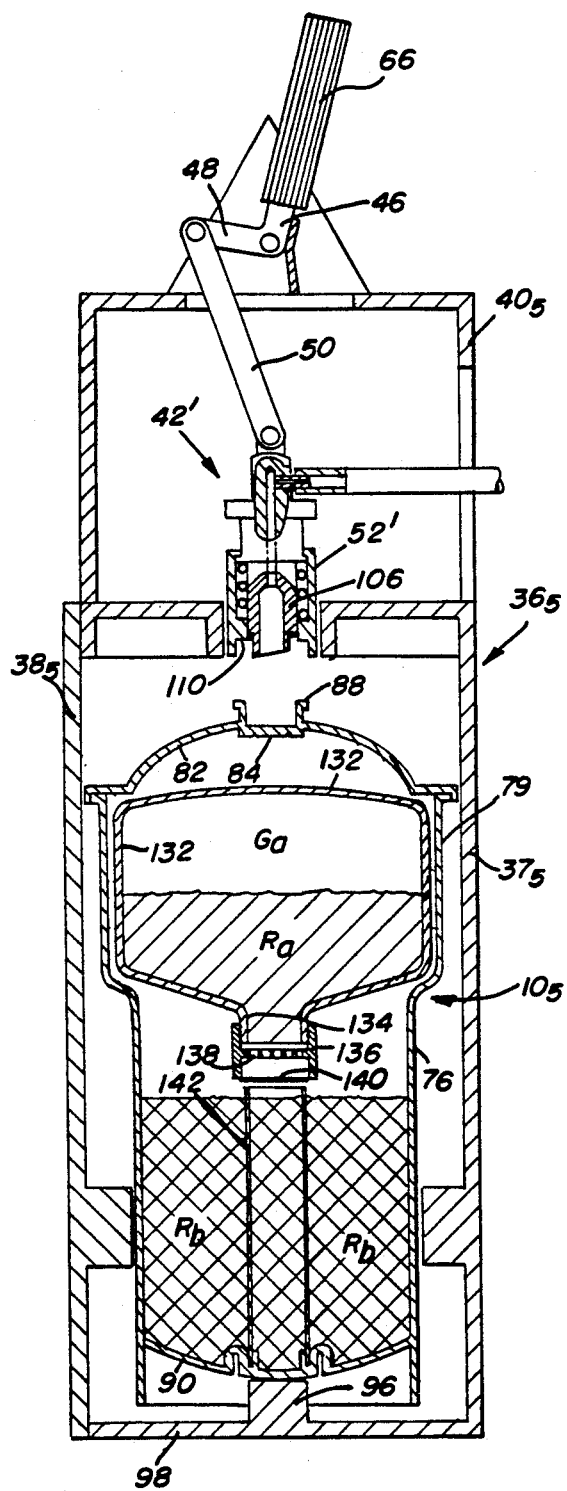
FIGS. 3I and 3J are central longitudinal sectional views of a fifth embodiment of a gas generator according to the present invention.
Figure 3J:
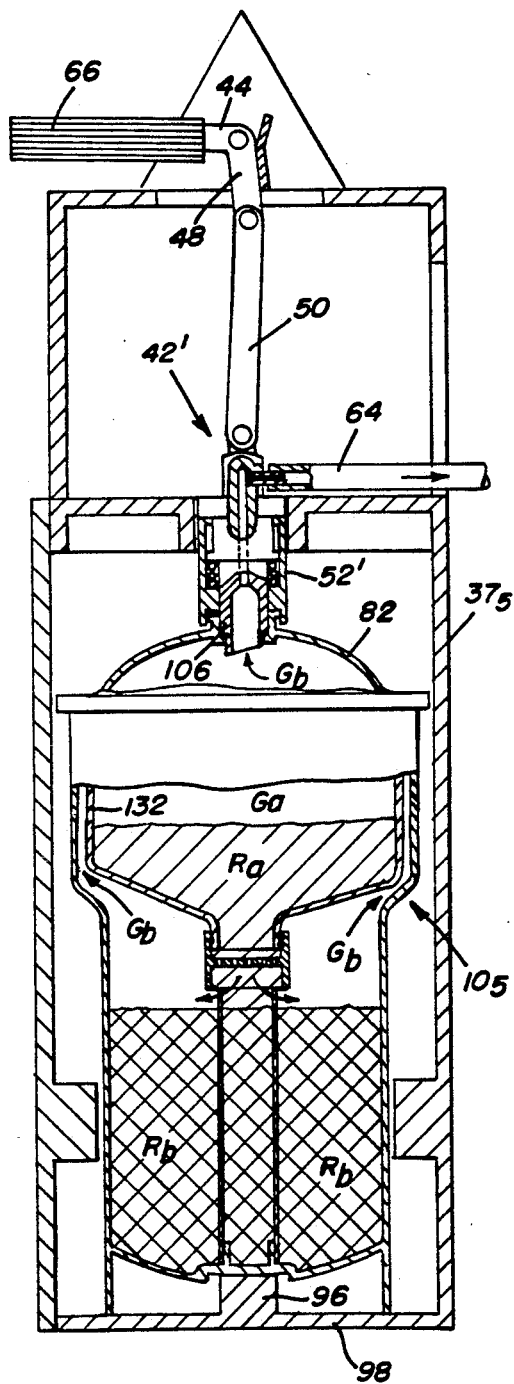

With respect to the fifth embodiment which is shown in FIGS. 3I and 3J, it comprises an inverted version of the third embodiment shown in FIGS. 3E and 3F where the position of the two reagents $R_a$ and $R_b$ are reversed, i.e. the reagent $R_a$ is located above the reagent $R_b$.

As shown for example in FIG. 3I, an inner reagent container 132 which is similar in shape to the container 112, shown in FIG. 3E and 3F, is located in the top portion of the body member 76, which includes an upper enlarged region 79 to accommodate the inner container 132. The container 132 is also inverted as before; however it now has a neck portion 134 which is fitted with a cap 136 including a filter element 138 and a puncturable seal 140. Inner container 132, also contains a pressurized gas $G_a$ and a liquid reagent $R_a$. The bottom section 90 of the outer container $10_5$ also is fitted with an elongated cylindrical punch member 142, the top portion of which resides adjacent the seal 140 of the inner container 132. The reagent $R_b$, as shown, surrounds the punch member 142 in the lower portion of the body member 76.

Upon operation of the actuator 42' as illustrated in FIG. 3J, the spring-loaded punch 106 severs the frangible disk 84 in the upper section 82 as well as forcing the container $10_5$ downward as before. This in turn causes the post 96 to force the cylindrical punch member 142 upward where it pierces the seal 140 in the cap 136, whereupon reagent $R_a$ will flow down into contact with the reagent $R_b$. The gas $G_b$ generated thereby flows up and around the inner container 132 to the upper region of the top section 82 where it is fed to the outlet tube 64.

Figures 3K, 3L:
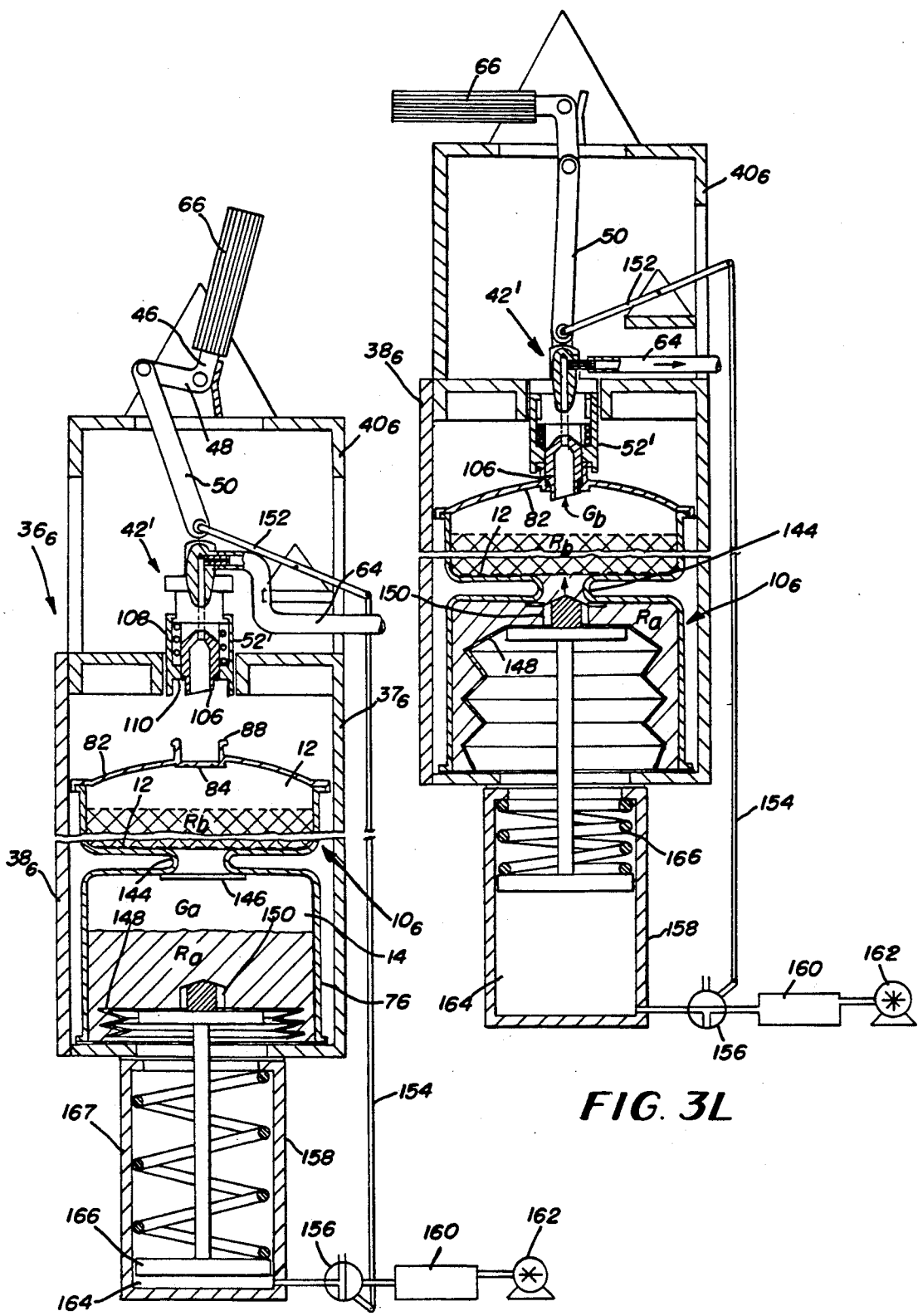
FIGS. 3K and 3L are central longitudinal sectional views of a sixth embodiment of a gas generator according to the present invention.

This now leads to the sixth embodiment which is shown in FIGS. 3K and 3L. There a modification of the gas generator compartment contemplated. As shown by reference numeral $10_6$, the gas generator comprises a structure having a top section 82 which is identical to the other embodiment so that it can be used in conjunction with the actuating mechanism 42' as before. The difference lies in the construction of the body section 76 and the lower portion thereof. There, a constriction or waste region 144 is formed substantially midway along the cylindrical body section 76 where there is located a puncturable seal 146 which acts to close off the lower reagent chamber 14 from the upper reagent chamber 12. In the bottom portion of the chamber 14, there is located an expansible bellows 148 to which is attached a blade 150 whose function is to pierce the seal 146 when the bellows 148 is expanded as shown in FIG. 3L.

Around the bellows 148 is located liquid reagent $R_a$ with a pressurized gas $G_a$ in the upper part of the chamber 14 as shown in FIG. 3K.

The bellows 148 is operated in conjunction with the actuator 42' by means of a linkage consisting of a pivoted arm 152 connected to the inner end of the actuator link 50. The arm 152 is coupled to a vertically depending link 154 which has its far lower end coupled to a pneumatic valve 156 which is coupled between a piston type actuator assembly 158 and an air pressure chamber 160 connected to an air compressor 162.

In operation, when the actuator 42' is operated by movement of the handle 66 downward, as shown in FIG. 3L, the frangible disk 84 at the top of the container 106 is punctured by the knife 106, but also the linkage members 152 and 154 operate to open the valve 156, causing compressed air to flow into the piston chamber 164. This forces a spring-biased piston 166 in cylinder 167 upward which causes the bellows 148 to expand, whereupon the blade of the knife 150 punctures the seal 146. The pressurized reagent $R_a$ then passes upward through the constricted region 144 where it comes into contact with the reagent $R_b$, causing the gas $G_b$, i.e. $CO_2$, to be generated as before.

It should be pointed out that with respect to the six embodiments disclosed in FIGS. 3A-3L, all parts other than the gas generator container $10_1$–$10_6$ comprise permanent apparatus and either form part of a beverage dispenser or is installed beside the dispenser, thereby making the gas generator, per se, disposable and replaceable with new generators in all instances.

Beverage Refresher

A gas generator in accordance with this invention can also be constructed as a capsule which is inserted in a carbonated beverage bottle and which releases $CO_2$ gas only when a closure or cap is applied. The intended purpose of this embodiment is to provide a means whereby $CO_2$ is maintained at a predetermined level following the bottling of a carbonated beverage or is replenished once a bottle containing a carbonated beverage has been opened and thereafter recapped for later consumption since it is known that a carbonated beverage turns "flat" after a certain period of time even when the bottle is recapped almost immediately. Also in the case of plastic type (polyethelene teraphelate) bottles, there is also a tendency for the $CO_2$ to dissipate directly through the bottle material itself providing a relatively flat drink prior to initial opening where there has been a relatively large storage period before consumption. An embodiment of this is shown in FIGS. 4A and 4B. The gas generator itself employs the principles explained above, but many other principles could also be adapted to this application when desired.

Figure 4C:
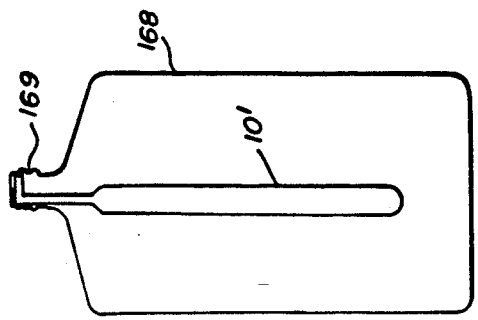
FIGS. 4A to 4C are illustrative of a gas generator capsule of the present invention inserted in a beverage bottle, FIG. 4A being a sectional view of the capsule, FIGS. 4B being a partial sectional view of the capsule in a bottle, and FIG. 4C being a diagrammatic view illustrating the relative proportions of the capsule and the bottle.
Figure 4B:
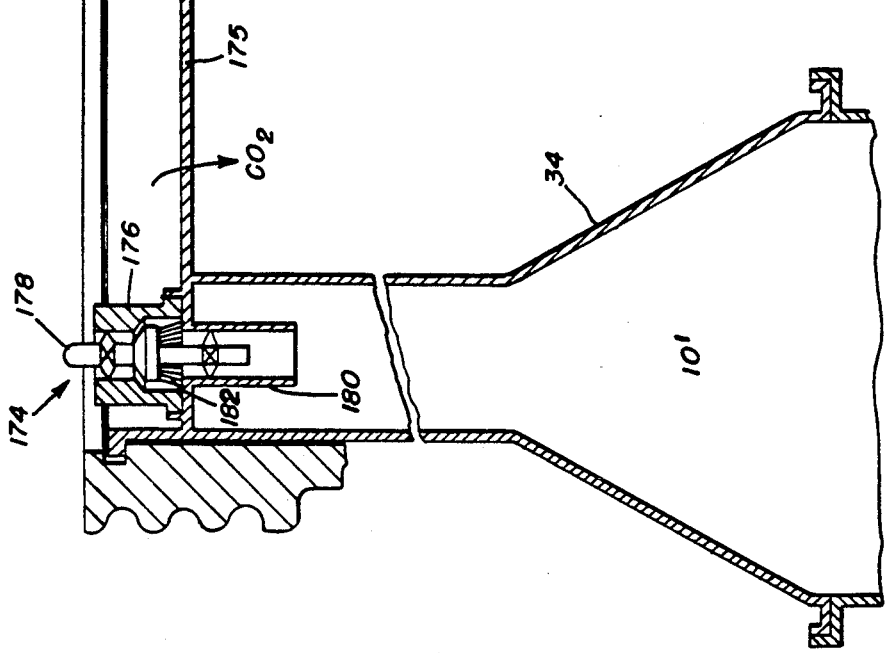
Figure 4A:
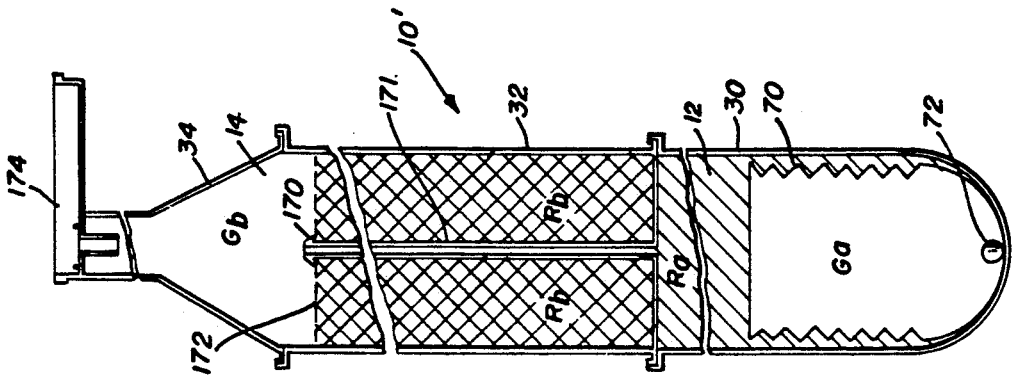

As shown in FIG. 4A, the gas generator capsule 10' is depicted as being pencil-shaped so that it can pass through the normal neck of a bottle 168 (FIG. 4C). The capsule 10' of FIG. 4A includes the same basic components already disclosed above with respect to the gas generator shown in FIGS. 3A and 3B, namely: first reagent chamber 12 comprised of a base or bottom section 30 containing liquid reagent $R_a$, and a pre-pressurized $G_a$ gas pouch 70, and a second reagent chamber 14 comprised of an upper intermediate section 32 containing reagent $R_b$, and a top section 34 which is adapted to hold gas generated therein and which in this case is modified to fit in the mouth 169 of the bottle 168.

Now, however, a gas valve 174 shown in FIG. 4B is included at the top of top section 34.

The intermediate section 32 has an orifice 170 at the upper end of a tube 171 extending between the upper and lower chambers 12 and 14, and which protrudes above the surface of the reagent $R_b$. A fine screen or filter 172 retaining the reagent $R_b$ is pressed over the lips of the orifice 170. Reagent $R_a$ flows up the tube 171 into contact with $R_b$ until the gas space in the upper chamber 12 achieves equilibrium with the pressure exerted by the flexible pouch on the reagent $R_a$.

As illustrated in FIG. 4B, a simple moulded plastic valve 174, which is actuated by the downward pressure of a closure member, e.g. a cap, not shown, is welded to the top section 175 which fits into the neck of the bottle 168. The valve 174 consists of two moulded plastic parts: a valve housing 176 and a valve spindle or stem 178. The valve spindle 178 extends into a relatively short delivery tube 180 and is moulded with a series of fingers 182, which act as springs. Assisted by the gas pressure of $G_b$, the springs 182 help to seat the valve whenever the downward pressure of the closure member, not shown, is removed from the bottle 168. Thus, no gas generated in the capsule 10' will escape while the bottle 168 is open. When the closure is reapplied, gas $G_b$ i.e. $CO_2$, will again be generated and feed the bottle head space until it is at equilibrium with the pressure in the flexible pouch 70. During transportation of the bottle 168, the gas valve 174 is also open so that any $CO_2$ lost is automatically fed back into the bottle 168 to keep the carbonated beverage fresh at all times.

However, no reagents can pass into the beverage since the reagent $R_b$ immediately below the gas valve 174 is powder. The gas exit tube 180 is also constructed so as to prevent liquids/solids escaping, and the gas pressure helps to keep the liquid in the lower space. Moreover, since beverage-type components are used for the reagents $R_a$ and $R_b$, a leakage from the gas generator capsule 10' would not affect the safe consumption of the beverage in the bottle 168.

Beverage Dispenser

Figure 5C:
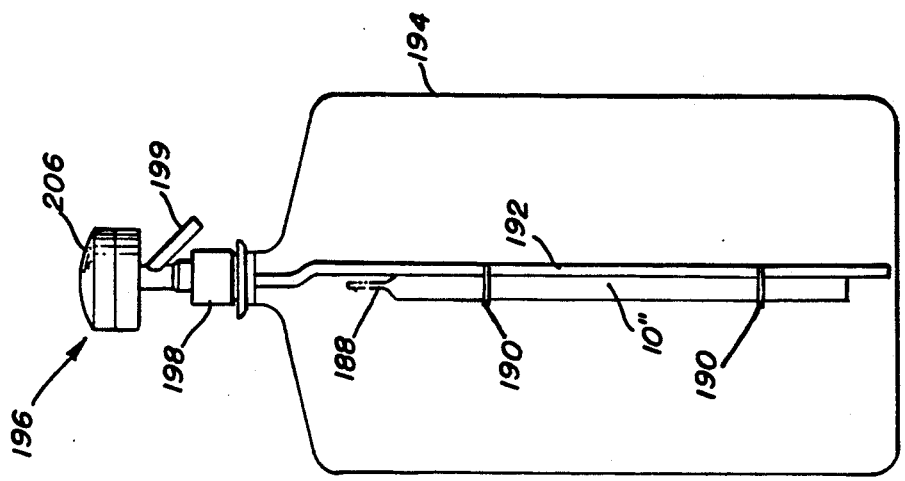
FIGS. 5A to 5C depict the use of the gas generator of the present invention in a beverage bottle equipped with a manually actuable dispensing head.
Figure 5B:
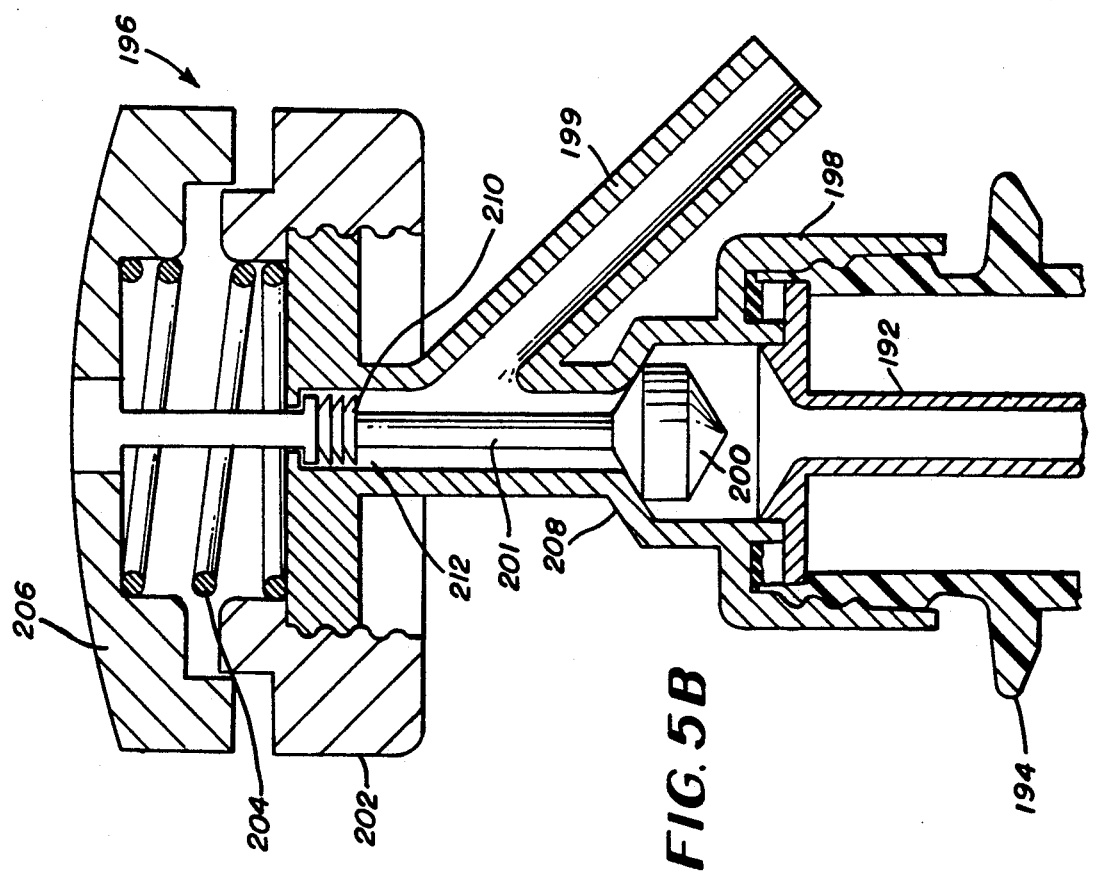
Figure 5A:
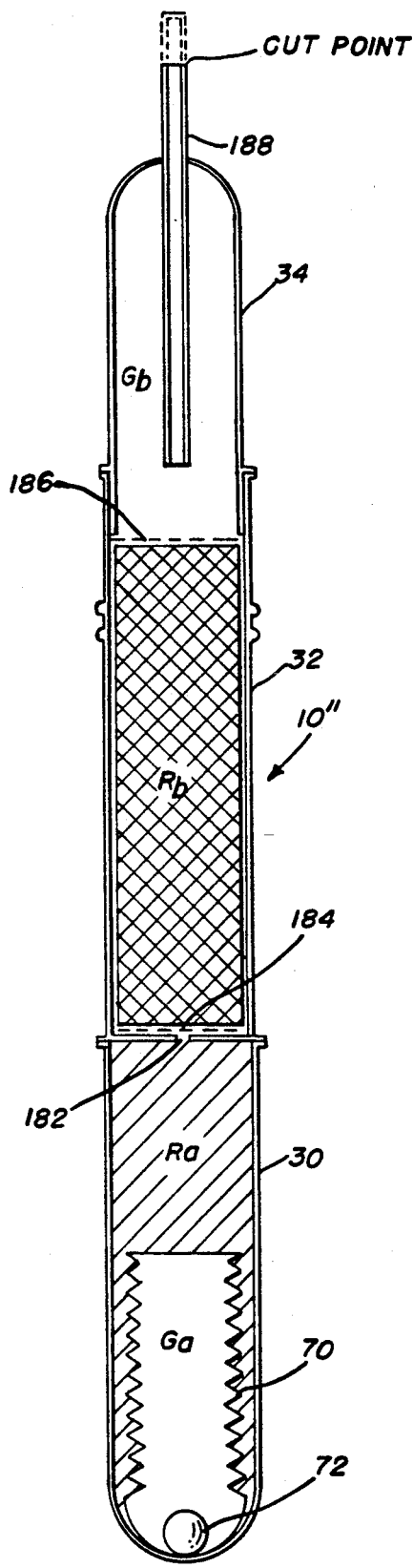

A gas generator in accordance with this invention may also be used to maintain a gas pressure in the head space of a beverage dispenser as shown by the configuration illustrated in FIGS. 5A, 5B and 5C. An elongated relatively thin gas generator capsule 10" for this purpose is shown in FIG. 5A. It, as before, is comprised of a base section 30 containing a liquid reagent $R_a$ along with a pre-pressurized flexible plastic pouch 70. It also includes an upper section 32 containing reagent $R_b$ which now additionally includes an orifice 182, a filter element 184, and a retention screen 186 at the top of the reagent $R_b$. A top section 34 is further included which holds down the screen 186 and includes the gas outlet tube 188. The gas outlet tube 188 is sealed when the gas generator 10" is assembled and the tube is cut as shown in FIG. 5A to initiate gas release immediately prior to its use. The gas $G_b$, preferably $CO_2$, is generated in the mode already described to maintain a head space gas pressure in the bottle. The gas generator 10" is cradled in moulded support hoops 190 located, for example, on a dispensing dip-tube 192, as shown in FIG. 5C, inserted down into a beverage container or bottle 194 and being connected to a manually operated dispensing apparatus 196.

The details of the dispensing apparatus 196 are shown in FIG. 5B. It is comprised of five elements: a cap portion 198 including a spout 199 which screws onto the threads on the mouth of the bottle 194, a valve 200 including a spindle 201, a transportation sealing lock ring 202, a spring 204 and a press down dispensing head 206. The valve 200 seats against a shoulder 208 on the base of the cap portion 198 and opens the flow when depressed downwards. A plurality of membranes 210, moulded onto the valve spindle 201, seal against the bore 212 of the top of the cap portion 198 to prevent liquid leakage. The spring 204 urges the valve 200 upwards so as to close the valve. In this it is assisted by the head space pressure within the bottle 194. When the spring 204 is compressed by a downward pressure on the dispensing head 206, the valve 200 opens and liquid flows from the spout 199, propelled by the gas pressure in the bottle head space.

For safe transportation, the sealing lock ring 202 presses the dispensing head 206 upwards ensuring that the dispensing valve 200 remains closed. The user breaks the seal of the ring 202 by screwing it downwards to a stop. This frees the dispensing head 206 and enables it to be used. All of the dispenser head parts described above are constructed of moulded plastic.

Aerosol

Figure 6A:
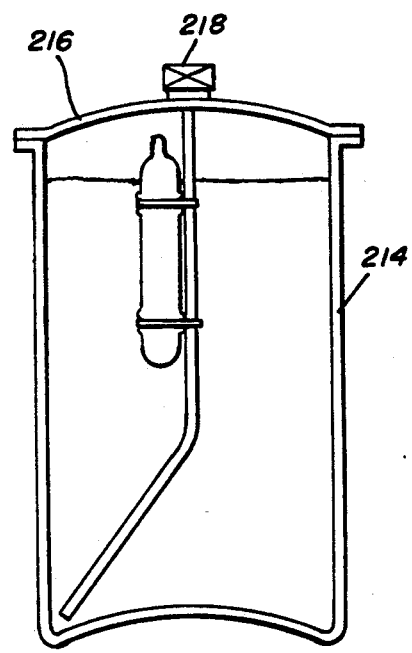
FIGS. 6A and 6B illustrate the use of a gas generator capsule of the present invention in an aerosol container for maintaining the required gas head-space pressure therein.
Figure 6B:
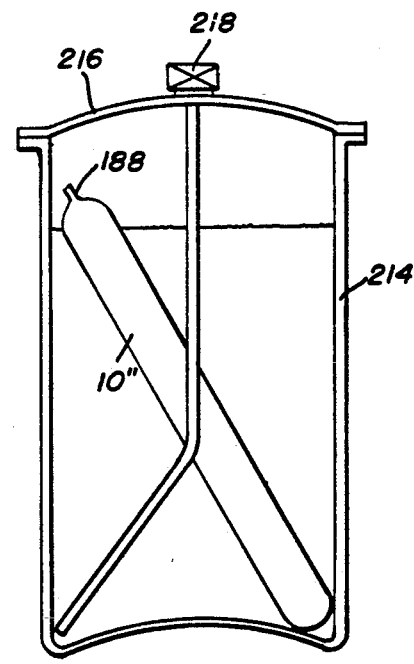

The gas generator capsules 10' and 10" illustrated in FIGS. 4A and 5A, respectively, can be also used to maintain a required gas head space pressure in an aerosol can. Two examples of such a device are shown in FIGS. 6A and 6B. Both employ the principles previously described. The release of gas can be initiated by cutting the gas outlet tube 188 shortly before the aerosol can 214 is sealed against a top or lid member 216 containing an aerosol dispensing head 218 as shown in FIG. 6B or as depicted in FIG. 6A by employing the simple construction of valve 174, which opens on the joining of the container lid 216 to the can 214. However, the latter configuration would delete the portion 174 from the device shown in FIG. 4B.

The invention being thus described, it will be obvious that the same may be varied in many ways. Such variations, therefore, are not to be regarded as a departure from the spirit and scope of the invention as set forth in the apended claims. Accordingly, all such modifications as would be obvious to one skilled in the art are herein meant to be included.

I claim:

1. An article of manufacture for chemically generating a gas, comprising:
   a vessel for housing a gas generating container;
   a changeable gas generating container removably located in said vessel, said container having first and second reagent chambers separated by at least a first partition, said first partition having at least one opening formed therein for permitting the passage of a first reagent between said chambers;
   said first reagent being located in said first reagent chamber;
   a second reagent being located in said second reagent chamber, said first reagent and said second reagent chemically reacting to generate a gas upon contact with each other;
   said second reagent chamber having a gas holding region for holding the gas generated;
   means for starting a reaction between said first and second reagents;
   means for applying a predetermined pressure to said first reagent to urge said first reagent into contact with said second reagent in opposition to a force caused by a pressure exerted by said gas generated against the first reagent; and
   movable coupling means having an external orifice on said vessel for coupling to said container and thereafter supplying said gas from said gas holding region of said second chamber to said external orifice.

2. The article of claim 1 wherein the gas generated comprises $CO_2$ gas.

3. The article as defined by claim 1 wherein said first reagent comprises a liquid reagent.

4. The article as defined by claim 3 wherein said means for applying a predetermined pressure comprises a second gas located in said first reagent chamber.

5. The article as defined by claim 4 and additionally comprising reagent filter means located at said first partition.

6. The article as defined by claim 5 wherein said vessel is comprised of first and second compartments and where said gas generating container is housed in said first compartment and where said coupling means are located in said second compartment.

7. The article as defined by claim 6 and further comprising a manually operable actuator mechanism located on said second compartment and connected at least to said coupling means.

8. The article as defined by claim 7 wherein said actuator mechanism comprises an angulated actuator arm member pivotally attached to said second compartment, and a straight link member connected between said actuator arm member and said coupling means.

9. The article as defined by claim 8 and additionally comprising a handle on said actuator arm.

10. The article as defined by claim 1 wherein said external orifice additionally comprises a gas output conduit and valve means in communication with said second reagent chamber, said output conduit being connectable to said coupling means for feeding gas out of said vessel when said valve means is open.

11. The article as defined by claim 7 wherein said means for applying said predetermined pressure comprises a gas generator means located in said first reagent chamber along with said liquid reagent.

12. The article as defined by claim 11 wherein said gas generator means further comprises an expandable closed package containing a pair of reagents with one of said pair of reagents including time delay means for reacting with the other of said pair of reagents to generate said second gas following assembly of said gas generating container.

13. The article as defined by claim 7 wherein said actuator mechanism is also connected to said means for starting a reaction.

14. The article as defined by claim 13
   wherein said second reagent chamber of said container further comprises a frangible element at said region holding the gas generated by a reaction between said first and second reagents; and
   wherein said coupling means further comprises means for breaking said frangible element.

15. The article as defined by claim 14 wherein said second reagent chamber further comprises a wall member and wherein said frangible element is located in said wall member.

16. The article as defined by claim 15 wherein said wall member further comprises means for engaging said actuator mechanism, said container being moved in a predetermined direction when said actuator mechanism is operated to operate said means for starting a reaction.

17. The article as defined by claim 16 wherein said means for starting a reaction further comprises a sealed reagent flow path between said first and second reagent chambers and a means for opening said flow path to permit the liquid reagent to contact the second reagent when said container is moved in said predetermined direction.

18. The article as defined by claim 17 wherein said sealed flow path further comprises a seal and wherein said means for opening said flow path further comprises means for rupturing said seal.

19. The article as defined by claim 18 wherein said wall member of said second reagent chamber comprises a top wall of said container, said predetermined direction of said container comprises the downward direction thereof, said container also comprising a bottom wall having said means for rupturing said seal thereon, and wherein said second compartment of said vessel comprises a bottom wall having a driver element thereon for forcing said means for rupturing said seal into contact with said seal when said container is moved downward by said actuator mechanism.

20. The article as defined by claim 19 wherein said means for rupturing said seal comprises an upturned spike.

21. The article as defined by claim 20 wherein said first reagent chamber for said liquid reagent comprises a bottom chamber in said container and said second reagent chamber for said second reagent comprises a top chamber.

22. The article as defined by claim 21 and additionally including an elongated conduit extending into said bottom chamber, having one end attached to said first partition and the other end positioned adjacent said upturned spike and having said seal affixed thereto.

23. The article as defined by claim 21, said bottom reagent chamber comprises an inverted bottle type lower inner chamber containing said liquid reagent, said inner chamber being surrounded by an outer descending chamber wall portion of said top chamber, said wall portion having means for supporting said inner chamber and providing a flow path around said inner chamber for said liquid reagent to said top chamber.

24. The article as defined by claim 19 wherein said reagent chambers comprise a pair of axially concentric inner and outer chambers.

25. The article as defined by claim 24 wherein said first reagent chamber for said liquid reagent comprises the inner chamber and said second reagent chamber for said second reagent comprises the outer chamber.

26. The article as defined by claim 25 wherein said inner chamber comprises an inverted bottle type chamber having a lower end having said seal affixed thereto.

27. The article as defined by claim 19 wherein said first reagent chamber for said liquid reagent comprises a top chamber in said container and said second reagent chamber for said second reagent comprises a bottom chamber.

28. The article as defined by claim 27 wherein said top reagent chamber comprises an inverted bottle type inner chamber containing said liquid reagent surrounded by an upwardly extending outer chamber wall portion of said bottom chamber, said wall portion additionally providing said region for holding the generated gas.

29. The article as defined by claim 28 wherein said inner chamber has a lower end including said seal affixed thereto, and additionally comprising an elongated driver extension member located in said bottom chamber intermediate said driver element and said seal for rupturing said seal when said container is moved downward by said actuator mechanism.

30. The article as defined by claim 15 wherein said wall member of said second reagent chamber comprises a top wall of said container, wherein said first reagent chamber for said liquid reagent comprises a bottom chamber in said container and said second reagent chamber for said second reagent comprises a top chamber, and wherein said means for starting the reaction further comprises a sealed reagent flow path between said top and bottom chamber and means operated by said actuator mechanism for opening said sealed flow path when operated.

31. The article as defined by claim 30 and further comprising a rupturable seal in said sealed flow path and wherein said means for opening said flow path comprises a piston driven means in said bottom chamber for rupturing said seal when said actuator mechanism is operated.

32. The article as defined by claim 31 wherein said piston driven means comprises a pneumatic piston assembly, means energized in response to operation of said actuator mechanism for supplying air to said piston assembly for moving said piston toward said seal, and means attached to said piston for puncturing said seal when said piston is extended.

33. The article as defined by claim 32 wherein said means attached to said piston comprises a knife blade.

* * * * *